Sept. 22, 1942.                H. A. BRASSERT                2,296,498
                         MANUFACTURE OF METAL PRODUCTS
                              Filed March 9, 1940
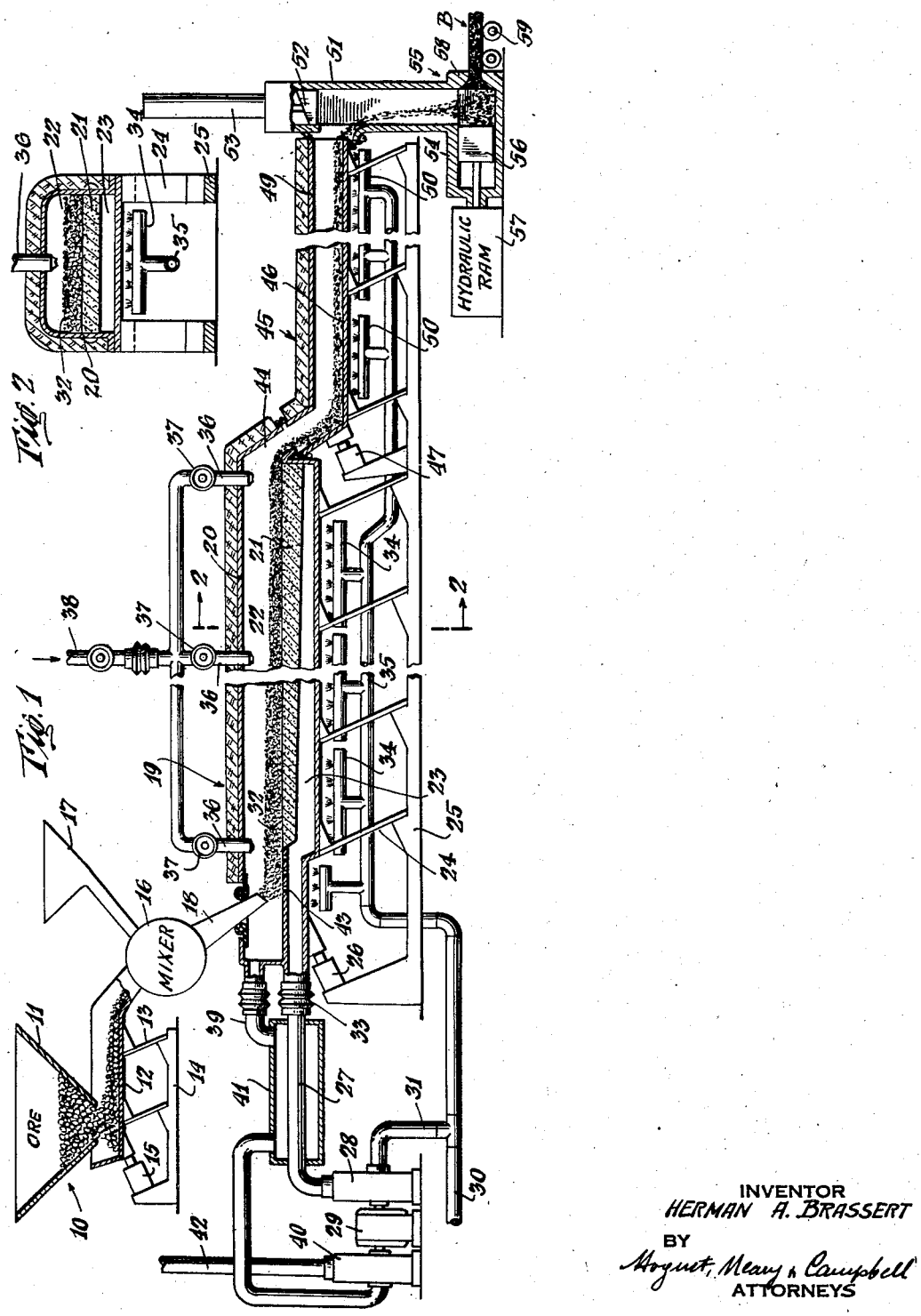
INVENTOR
HERMAN A. BRASSERT
BY
ATTORNEYS Patented Sept. 22, 1942

2,296,498

UNITED STATES PATENT OFFICE 2,296,498

MANUFACTURE OF METAL PRODUCTS

Herman A. Brassert, New York, N. Y., assignor to Minerals and Metals Corporation, New York, N. Y., a corporation of Delaware Application March 9, 1940, Serial No. 323,076

2 Claims. (Cl. 75—91)

This invention relates to the direct reduction of iron and other metallic ores and the production of metal products from the reduced metal in a continuous process without involving a melting step.

The production of metals such as iron directly from the ores without a melting step is well known and has been accomplished by several processes. These prior processes enable but a low rate of production, either because of the slowness of the reduction process itself, or because of the limited production capacity of the reducing furnaces or other reaction equipment, or both. Accordingly, unless the reduction equipment is materially multiplied or increased to a size disproportionate to the output, these prior direct reduction processes can not compete with the conventional smelting process of producing molten metal in sufficient volume to continuously and economically feed modern steel mills. The smelting process, for instance in blast furnaces, is relatively expensive and because undesirable elements are avidly absorbed from coke and fluxes by the metal in its molten state, the resulting product is impure and a purifying step before finishing is generally required in order to eliminate, neutralize, or minimize the impurities. But the smelting process, although objectionable for the reasons mentioned, is today the only practical process of producing metals from ores in sufficient quantity to render their production economically practical for use in modern iron and steel and most non-ferrous metal producing plants.

It is the principal object of this invention to produce iron and steel and other metals directly from the ore without requiring a melting step and at rates commensurate with the normal capacity of modern forging, rolling, or shaping equipment for manufacturing semi-finished or finished metal products.

Another object of this invention is to produce ferrous and non-ferrous metals economically and expeditiously with inexpensive reagents available in many localities, to the end that a metallic product is obtained which may compete, in so far as quality and purity are concerned, with the iron, steel, and other metals produced in the open hearth and electric furnace or by the crucible process, and at much lower cost.

A further object of this invention is to produce semi-finished and finished metal products having a controlled grain structure and other selected physical and chemical properties commensurate with the intended use of the product.

These and other objects of the invention are obtained by grinding the ore, such as iron ore, or roll scale, or other metal oxides, to a pulverulent state, preferably down to 60 mesh or finer; substantially entirely removing the gangue therefrom by magnetic or electrostatic separation, flotation, jigging, or chemical or other methods of concentration; adding to the pulverulent ore such fluxes, alloying metals or other modifying agents as may be desired, or reducing agents, these agents being likewise pulverulent; passing a reducing gas through a mass of the ore or continuously through a stream of the ore for effecting the reduction thereof while heated to the reducing temperature, but without fusion; agitating the ore while it is being treated with the reducing gas to accelerate the reducing reaction, and then discharging the reduced ore, preferably while still hot or further heated to a grain-consolidating temperature, to a suitable compacting and deforming apparatus, such as an extrusion press, rolling mill, forge, or the like, for working the heated reduced particles into a solid homogeneous product which may then be further worked to convert it into a semi-finished or finished product.

In a preferred embodiment of the apparatus of this invention, the pulverulent raw ore, with or without modifying or reducing agents admixed therewith as described, is advanced along a perforate or pervious deck while being heated to the reducing temperature, and a reducing gas is forced through the perforations or interstices in the deck so as to pass through and mix intimately with the ore and thus react with the oxides in the ore to reduce the latter to metal. Preferably, the reducing reaction is accompanied by active agitation of the ore particles, which expedites the reaction by facilitating percolation of the ore by the gas and causing the ore particles to rub together. The turbulence and intermingling circulation of the gases and solids and the rubbing of the particles against each other not only causes removal by attrition of the skins of reduced metal as they form on the particles, but also causes repeated rupture of the spent gas envelopes surrounding the particles, thus permitting fresh reagent to attack the unreduced portions of the ore in the particles under the reduced surfaces thereof.

In one form of the apparatus, this agitation of the ore particles is effected by vibrating the deck in such a way that the particles are projected upwardly and forwardly as in a conventional vibrating conveyor, so that the ore is advanced through the reducing zone while being gradually reduced to metal. This action is carried on for a sufficient time and/or length of conveyor until completely reduced and is then discharged by the vibrating deck into a further heating zone or directly to the apparatus for compacting the particles into a bloom, billet, or the like.

It will be seen that by means of this invention, pure metal products having superior physical and chemical properties can be produced economically and efficiently directly from the ore without requiring an intermediate melting step. Because there is no melting step the absorption of undesirable elements is precluded, since the metallic powder does not come into contact with impurities, such as carbon, sulphur, phosphorous, and other detrimental materials contained in the coke as occurs in the blast furnace. Also, the physical and chemical properties of the finished or semi-finished materials may be closely controlled in the process and apparatus of this invention by the particle size, the temperature and by admixing of proper modifying or reducing agents. These advantages are obtained without loss of materials and the reagent gas is readily available in many localities having natural or artificial gas, such as by-product gas, water gas, refined oil gas containing the proper reagent ingredients, such as carbon monoxide, hydrogen, or hydrocarbon compounds, or organic compounds, or mixtures thereof.

For a more complete understanding of the invention, reference may be had to the accompanying drawing, in which:

Figure 1 is a diagrammatic representation of one form of the apparatus for conducting the process of this invention, and Fig. 2 is a transverse section through the reducing chamber as seen along the line 2—2 of Fig. 1.

An example of the material to be treated is preferably a rich iron ore, such as magnetite or hematite, although it may be a non-ferrous ore, or mixtures thereof, depending upon requirements. The ore, for example, iron ore, is crushed and then pulverized, as by grinding to a fineness such that the valuable portion of the ore may be readily freed from the gangue, which is associated therewith. Depending upon the nature of the ore, the degree of pulverization may be quite fine, for instance, such that it will pass a 60 to 100 mesh screen. If higher grade products are required, or the ore contains considerable gangue, or gangue difficult to remove, the ore must be ground still finer, such as up to 200 or even up to 400 mesh size. On the other hand, the ores may be of such porosity as to be permeable to the reducing agent and thus do not require such fine grinding. The gangue is then separated from the remainder of the ore in any suitable way, such as by magnetic or electrostatic separation for magnetite ore, jigging or flotation for hematite and other non-magnetic ores, chemical, or other methods of beneficiation. If the raw material is in the form of iron sands or roll scale, it may be concentrated, if necessary, in these or other ways directly without the crushing step, although fine grinding to the required pulverulent state is even then necessary in most instances.

The pulverulent raw ore may have admixed therewith, if desired, certain modifying agents, such as soda, fluorspar, or other fluxes for the purpose of combining with the remnant of impurities left in the powder to be squeezed out in the process of extruding, rolling, or forging, such fluxes having a substantially lower melting point than the metals and being substantially as finely-divided as the ore powder, or finer; or silicon, carbon, sulphur, or other elements desired in the finished steel may be added in powdered form to the raw ore powder; or manganese, titanium, nickel, chromium, or other metals or alloys of such metals with iron or with each other, or reducible components thereof, in the form of powder, preferably as fine as the ore powder, or finer, may be admixed with the raw ore powder for the production of alloy steels. In some cases, additional reagent, such as reducible compounds like ferro-silicon, pure carbon, such as carbon black, ground pitch, substantially ash- and sulphur-free coal or charcoal, may be added in order to facilitate the reducing reaction, but in most instances where the proper reducing gas is obtainable this additional carbon may not be necessary.

Referring to Fig. 1, numeral 10 designates a vibrating feeder comprising a hopper 11 containing the pulverulent raw ore, this hopper 11 discharging upon an elongated tray or pan 12 supported on spaced spring bars 13 anchored at their lower ends on a suitable base 14, which also rigidly supports vibrator 15, preferably of the electric type, for vibrating the hopper 11 and the tray 12 at high frequency, the tray being vibrated in a generally lengthwise direction, i. e., in the general direction of travel desired for the material. The frequency of the vibration for the fine material here employed depends on the load and rate of feed. Thus, by adjusting the unit number of vibrations imparted to the tray 12, the rate and volume of feed of the material along tray 12 may be regulated with great accuracy. The particular type of vibrator feeding impulse mechanism shown herein forms no part of the present invention, but is a commercial vibratory feeder, further details of which may be obtained upon reference to Patent No. 2,094,787, issued October 5, 1937, to J. G. Flint. Equivalent vibrating feeding mechanism may be used with equal facility.

If the aforementioned modifying agents, fluxes, reagents, or the like, are to be admixed with the ore powder, the vibrating conveyor 10 whose rate of feed is known, discharges into a suitable mechanical mixer 16 whose motor-driven beater, not shown, mixes with the ore powder a predetermined proportion of the modifying or reducing agent, flux, or mixtures thereof, which are introduced into the mixer by means of a hopper 17. If desired, a vibrating feeder like 10 may be utilized to supply a continuous stream of the modifying or reducing agent or flux, into the mixer 16 in the proper unit volume ratio to the ore powder supplied to the mixer by feeder 10.

Whether or not the mixer is used, the finely-divided material is discharged through spout 18 directly into the retort 19, which, as shown particularly in Fig. 2, is preferably a rectangular section tube 20 suitably covered with a layer of heat-insulating material, with the exception of its bottom wall. The entire retort 19 may be made of metal of the proper constituency to withstand the temperature and the reducing atmosphere therein.

Extending horizontally across the interior of the retort 19 is a deck 21 dividing the interior of the retort into reducing chamber 22 above the deck 21 and a reagent gas supply chamber 23 beneath the deck 21. The deck 21 is perforate and may conveniently be a slab of suitable refractory material, such as silicon carbide, known commercially as carborundum, which is naturally pervious, or aluminum oxide, known commercially as alundum, or other similar material, made pervious by being so prepared as to contain a myriad of closely spaced very fine passages extending from its bottom surface therethrough to the top surface thereof, so that communication between the chambers 23 and 22 is provided through these passages. The deck 21 is preferably tapered, as seen in Fig. 1, thus providing a gradually increasing cross-section of hearth and a gradually decreasing cross-section of gas chamber 23, the purpose of which will be described.

The retort 19 is preferably supported by flexible bars 24 on the base 25 and is vibrated at high frequency by vibrator 26, which is like vibrator 15 previously described, so that the retort 19 acts as a conveyor of the powdered material in the manner described in said patent. Accordingly, the raw ore discharged by spout 18 on the deck 21 is advanced therealong in a continuous stream from left to right, as seen in Fig. 1.

Directly connected to reagent gas chamber 23 is a gas supply pipe 27 through which reagent gas is supplied to chamber 23 by a pump 28 driven by an electric motor 29 or other power source. The gas is drawn by pump 28 from a gas supply main 30 through pipe 31. In order to accommodate the vibration of the retort 19, the connection between gas pipe 27 and chamber 23 is effected through a flexible coupling 33. The pressure at which the reagent gas is continuously supplied to chamber 23 is sufficient to enable the gas to flow upwardly through the pervious bed 21 and percolate through the vibrating and advancing ore bed 32 under sufficient pressure to completely envelop each ore particle and aid in creating the desired turbulence in the ore.

In order to preclude cracking of the gas in the pores of the deck 21 at the temperature of reduction of the ore, and consequent clogging of the pores by deposited carbon, tars and the like, a gas is selected which does not crack or otherwise deposit solids at the working temperature of the retort, or which has a higher cracking temperature, or the gas may be cracked or otherwise treated to remove or fix these materials before use in retort 19.

Positioned beneath the floor of chamber 23 is a series of gas burners 34 supplied by a manifold 35 in turn supplied by gas main 30 under a sufficient pressure to insure steady supply for combustion in the burners 34. The burners 34 are positioned immediately beneath the floor of the gas chamber 23 so as to heat the gas to the proper temperature for effecting reduction of the ore in the manner to be described.

Connected to spaced points along the retort 19 and discharging into reducing chamber 22 are a plurality of pressure air pipes 36 controlled by valves 37 for bleeding in sufficient pressure air from supply 38 to burn the excess reducing gas which emerges from the ore bed 32, the carbon monoxide by-product of the reaction when carbon is added, hydrogen, and other combustible gaseous by-products. The air supplied is only sufficient to sustain neutral combustion of these gases so as to preclude reoxidation of the reduced ore and the combustion of these gases serves to additionally heat the ore bed 32 to promote the reducing reaction. The products of combustion of these gases are withdrawn from the left-hand end of the retort 19 as seen in Fig. 1, and serve to pre-heat the ore as it discharges from spout 18. These gases are withdrawn through duct 39 by a suction pump 40 driven from motor 29 after the gases have passed through a heat-exchanger 41 surrounding gas supply pipe 27, whereby the reduction gas is conveniently preheated. The spent products of combustion may be discharged to a stack 42 by suction pump 40.

In order to more readily start the reducing operation and accelerate it after starting, the ore may be preheated by bleeding a small quantity of the combustible reducing gas from chamber 23 through small openings in the floor 43 ahead of the deck 21. This gas percolates through the ore deposited on floor 43 from chute 18 and mixes with the air entrained therein, although additional air may be supplied by pipe 36. Upon ignition of this gas-air mixture within the ore the oxygen in the entrained air is not only removed, but the ore is preheated.

Communicating with the discharge end of retort 19 through a chute 44 is a muffle 45 arranged in the form of another enclosed vibratory conveyor similar to retort 19 except that the perforate deck 21 is omitted. The material is advanced over the imperforate deck 46 in the manner described in said patent, the vibratory impulses being supplied by vibrator 47 which is like vibrators 15 and 26. The deck 46 is supported by flexible bars on base 25 and is enclosed by a hood 49. Gas burners 50 positioned immediately below deck 46 heat the reduced material to the temperature necessary to consolidate the particles, which is usually near welding temperature but short of actual fusion to preclude sticking of the particles to the walls of the apparatus.

The vibratory muffle 45 discharges into a stationary vertical hopper 51 of square cross-section sealed to the end of the muffle 45 by a flexible collar which accommodates the vibration between them. The hopper 51 contains a reciprocating plunger 52 driven by air cylinder 53 for initially compressing the reduced ore powder in cylinder 54 of extrusion press 55. Cylinder 54 of press 55 is of square cross-section and contains the reciprocating plunger 56 driven by the hydraulic ram 57. Cylinder 54 communicates with a converging extrusion die 58 opposite the end of plunger 56 and in turn discharging on to a roll conveyor 59. Hopper 51 may be heated if desired, so as to maintain the material hot in its course to the cylinder 54 of press 55, which may be likewise heated if desired, but ordinarily neither hopper nor press need be specially heated. Whether or not the hopper 51 is heated, it is covered with heat insulation material similar to that shown on the retort 19 and the muffle 45.

In operation of the apparatus, the pulverulent raw ore, concentrated and cleaned in the manner described, is supplied from hopper 11 by vibrator feeder 10 to the mechanical mixer 16, in which the aforementioned fluxes, alloying materials, or other modifying agents, or reducing agents, continuously added by hopper 17 in proper ratio to the raw ore, are admixed therewith. Whether or not these additional materials are added, the raw ore is discharged by spout 18 upon floor 43 for preheating by combustion of gas therein. The preheated ore is advanced from floor 43 to deck 21 and therealong by the high frequency vibration imparted thereto and to the entire retort 19 by one or more of the vibrators 26 in the manner described in said patent. In this way, the raw ore is rapidly agitated and simultaneously gradually advanced along the deck 21 with the continuous up and down and simultaneous forward progression motion characteristic of that method of vibration.

As the mass of raw ore in this state of continuous vibration is advanced along deck 21, the reducing gas is forced through the interstices in the deck 21 so as to penetrate the ore bed 32 and percolate therethrough in a myriad of fine streams in intimate contact with each of the vibrating ore particles. This gas is heated to such temperature that the ore is treated at its reducing temperature, which is in the neighborhood of 1800° F. for relatively pure magnetite.

All of the heat need not be supplied by the sensible heat of the reducing gas or the burning gas in the ore on deck 43, inasmuch as the surplus gas not required for the reaction that emerges from the bed 32 and the combustible products of the reaction are burned within the reducing chamber 23 above the bed by adding a sufficient amount of air thereto through pipes 36 in the manner described. In any event, the ore is uniformly heated to the reducing temperature and the reaction takes place in the known manner, the oxides of the ore combining with the reagent, whether gaseous or gaseous and solid, thus leaving substantially pure metal. For example, for iron oxide, the reducing gas may be either hydrogen or carbon monoxide or mixtures thereof, or a gas plus a solid reagent like carbon admixed with the ore. Preferably a natural gas rich in hydrogen or carbon monoxide or both, or artificial gases, such as by-product gas, water gas, refined oil gas containing the proper reagent ingredients, or properly constituted hydrocarbon compounds, or organic compounds or mixtures thereof, for example. Preferably the reducing gas should contain no deleterious substances such as sulphur or sulphur-forming compounds, although inasmuch as the material is not molten, sulphur and the like are not readily absorbed thereby, so that sulphurous materials, such as sulphur-containing solid reagents may be used without detrimental effects.

During the reaction the particles of ore are in constant motion, due to the high frequency vibration imparted thereto by the vibrator 26 in working the ore bed 32 along the deck 21, as described, which is aided by the gas percolating therethrough under pressure. This turbulent vibrating motion has the effect of continuously loosening and moving the compact particles relatively to each other with a rubbing or attrition action, which not only results in removal of the reduced metal skin on each particle but also repeated rupture of the envelope of spent gases surrounding each particle, thus enabling the constantly circulating fresh reagent to attack the unreduced portions of the particles. This attrition gradually reduces the size of the particles so that even relatively initially large particles that are porous to the reagent are more finely divided as they progress through the retort, so that they emerge as a smaller mesh size.

The ore volume is decreased during reduction so that as it progresses along the deck 21 it requires less gas and, since its depth decreases, the gas pressure can be decreased. To gradually reduce the gas volume, the cross-section of the gas chamber 23 is decreased as shown in Fig. 1, so that less gas is supplied as the reduction progresses. The gradually increasing thickness of the deck 21 effects the decrease in pressure, since the tortuous passages therethrough formed by the interstices therein are longer and thus increase friction to reduce ultimate gas pressure.

In order to supply ample reducing gas to envelop each ore particle so as to effect complete reduction thereof, a surplus of gas is supplied through the ore bed 32 to be burned in retort as described, or only part of it may be so burned or all of it may be withdrawn by pump 28 and recycled after regeneration, such as by passing it over an incandescent coke bed to carburate the water vapor and to convert carbon dioxide to carbon monoxide, or the recirculating gas may be purified as by washing to remove excess water vapor and the carbon dioxide. Electric arc regeneration or other regenerating or purifying processes may be employed.

It will be understood that the retort 19 may be as long as required commensurate with the rate of reduction on which depends the rate of progression of the ore and degree of heat application thereto. The heating is progressive so that the reaction progresses gradually and results in a more complete reduction than if the reaction were promoted suddenly in a short heat zone. Thus, with a properly adjusted rate of feed, length of retort 19, and heating degree the material reaches the end of the retort 19 as completely reduced ore. This reduced ore discharges into the muffle 45 through which it is advanced by the vibratory motion imparted by vibrator 47 while being heated to a high temperature, although less than fusion, to be discharged into chute 51 to be compacted in cylinder 54 by reciprocating plunger 52 which is synchronized with press plunger 54 so that the latter remains retracted to expose the interior of cylinder 54 while the plunger 52 forces the material therein. The compacted hot material in cylinder 54 is then forced by plunger 56 through converging extrusion die 58 to be compacted in all directions laterally and longitudinally into a dense homogeneous bloom or billet B.

Billet B is preferably of relatively large dimensions comparable to the blooms or billets fed to the metal working equipment of a modern steel mill, such as rolls, hammers, forges, presses, further extrusion or drawing dies, tube mills, ring or push benches, and the like. Before being fed to such finishing or semi-finishing equipment the bloom or billet B may be reheated if desired, or it may be cold finished.

The billet B, when extruded as described, has transverse tensile strength equivalent to its longitudinal tensile strength, and has a very fine grain structure, modified as and if desired by the inclusion of the aforementioned elements, alloying metals, or the like. While the direct extrusion of the finely-divided reduced ore in the manner described is preferred, the reduced ore may be compacted into a self-contained billet, which is then heated to or near the welding temperature of the material and worked into a homogeneous metal body, as described in copending application Serial No. 316,717, filed February 1, 1940, by H. A. Brassert; or the reduced ore powder may be charged into containers of similar metal, the whole heated to the consolidation temperature and the container and its contents worked into a unitary body, as disclosed in copending application Serial No. 318,814, filed February 14, 1940, by H. A. Brassert.

The various steps in the process from the reducing zone to the press 55 are conducted under neutral atmospheric conditions to preclude reoxidation of the reduced ore. The gaseous products of the reactions maintain non-oxidizing atmospheres within the closed system, the air added by pipes 36 being not sufficient in volume to effect this condition since only enough air is admitted to promote combustion of the combustible gases with ignition thereof practically instantaneous.

The retort 19 may be adapted, without material change, to operation under suction, i. e. pump 40 may be a pressure pump connected to gas supply main 30 for supplying the reducing gas above the ore bed 32, while pump 28 may be a suction pump drawing the spent and surplus reducing gas downwardly through the ore bed and pervious vibrating deck 21. The heating may be effected jointly by burners 34, or burning the surplus combustible gas in chamber 23, or burning some of the reducing gas in reducing chamber 22, or combinations of these means.

Although the deck 21 is shown horizontally arranged, it may be tilted downwardly or upwardly from the intake end, depending upon requirements, this tilting having an effect on rate of feed, gas flow, and the like.

Instead of heating the pulverulent material either in the raw or reduced state by external heating means, such as the gas burners 34 described, the material may be heated in other known ways, such as by electric resistance heaters within the mass of the charge, burners within the retorts 19 or the muffle 45, or by electric induction in a manner similar to that described in copending application Serial No. 319,197, filed February 18, 1940, by H. A. Brassert.

Also, by heating the reduced material in the press 55 to the plastic state, such as by the electric induction method described, or other heating method, the material can be immediately worked into finished shapes, rails, and the like, by providing an extrusion die 58 with the proper configuration, thus eliminating the first particle consolidation step and going directly to the metal shaping step. Conversely, the material may be discharged directly from the retort 19 to the extrusion press 55 for compacting into a bloom or billet requiring further working instead of being first heated to a higher temperature in the muffle 45.

From the foregoing description of a typical embodiment of the invention, it will be apparent that this invention provides very simple and effective ways of rapidly and continuously and directly converting pulverulent raw ore into solid, dense and homogeneous bodies easily converted into semi-finished or finished metal products, such as shapes, rails, tubes, sheets, and the like, and that while the process is particularly applicable to the treatment of iron and steel, it is also possible to treat other ferrous or non-ferrous metals or alloys in a similar way. Therefore, the above-described example of a typical embodiment of the process should be considered as illustrative only and not as limiting the scope of the following claims.

I claim:

1. The process of making a metallic product, which comprises charging pulverulent raw ore into a closed retort, vibrating the ore at high frequency while in said retort in such manner as to effect both agitation and an advancing movement thereof, simultaneously passing a reducing gas upwardly through the independently agitated charge in a great number of closely spaced individual streams distributed throughout the mass of ore, heating the mixture while so treated with gas and vibrated to effect reduction of the raw ore, admitting a sufficient amount of oxygen to the retort above the charge to sustain combustion of the combustible products of the reaction, discharging the reduced ore from the retort and continuously withdrawing the gaseous products of the reduction and combustion in counterflow relation to the movement of the ore through the retort.

2. The process of making a metallic product, which consists in establishing and maintaining a layer of powdered ore to be reduced of substantially uniform depth in any section transverse to its direction of travel, subjecting said layer of powdered ore to the percolating action of a reducing gas directed upwardly against the bottom side of said layer in jets immediately adjacent to each other and so distributed throughout the entire bottom area of said layer as to subject substantially the entire under surface of said layer to immediate impingement thereby, independently agitating the ore to facilitate both percolation of the reducing gas through the layer of powdered ore, reactive contact of all particles of the ore with said gas and travel of the powdered material through the reaction zone, simultaneously heating the powdered ore to a reducing temperature less than the fusion temperature of any of the constituents thereof, at least a part of said heat being provided by supplying substantially only sufficient oxygen to burn the combustible constituents of the gases emerging from said layer of powdered material, and continuously withdrawing the gaseous products of the reduction and combustion in counterflow relation to the movement of the powdered material through the reaction zone.

HERMAN A. BRASSERT.